US009036906B2

(12) United States Patent
Scheuermann et al.

(10) Patent No.: US 9,036,906 B2
(45) Date of Patent: May 19, 2015

(54) METHOD AND APPARATUS FOR IMAGE SEGMENTATION

(71) Applicant: Thomson Licensing, Issy de Moulineaux (FR)

(72) Inventors: Bjoern Scheuermann, Ronnenberg (DE); Oliver Jakob Arndt, Hannover (DE); Bodo Rosenhahn, Ronnenberg (DE)

(73) Assignee: Thomson Licensing, Issy-les-Moulineaux (FR)

( * ) Notice: Subject to any disclaimer, the term of this patent is extended or adjusted under 35 U.S.C. 154(b) by 46 days.

(21) Appl. No.: 13/862,413

(22) Filed: Apr. 13, 2013

(65) Prior Publication Data

US 2013/0279801 A1  Oct. 24, 2013

(30) Foreign Application Priority Data

Apr. 20, 2012 (EP) .................................... 12290140
Sep. 11, 2012 (EP) .................................... 12306092

(51) Int. Cl.
*G06T 7/00* (2006.01)

(52) U.S. Cl.
CPC ............. *G06T 7/0081* (2013.01); *G06T 7/0087* (2013.01); *G06T 2207/20141* (2013.01)

(58) Field of Classification Search
CPC ................ G06T 7/0081; G06T 7/0087; G06T 2207/20141
USPC ........................... 382/164, 180, 131; 345/424
See application file for complete search history.

(56) References Cited

U.S. PATENT DOCUMENTS

| 6,885,771 | B2 | 4/2005 | Takahashi | |
|---|---|---|---|---|
| 7,706,610 | B2 | 4/2010 | Zhang et al. | |
| 7,773,807 | B2 | 8/2010 | Grady et al. | |
| 8,090,180 | B2 | 1/2012 | Maier et al. | |
| 8,670,615 | B2 * | 3/2014 | Piramuthu et al. | 382/173 |
| 2007/0237393 | A1 * | 10/2007 | Zhang et al. | 382/173 |
| 2007/0253632 | A1 * | 11/2007 | Ting | 382/254 |
| 2011/0075926 | A1 * | 3/2011 | Piramuthu et al. | 382/173 |
| 2011/0200255 | A1 | 8/2011 | Tieu et al. | |
| 2011/0216976 | A1 | 9/2011 | Rother et al. | |
| 2012/0075682 | A1 * | 3/2012 | Amoroso | 359/1 |
| 2012/0313942 | A1 * | 12/2012 | Chen | 345/424 |

(Continued)

FOREIGN PATENT DOCUMENTS

| CN | 101714253 | 5/2010 |
|---|---|---|
| KR | 101015671 | 2/2011 |

OTHER PUBLICATIONS

Raymond Phan et al., "Interactive Video Growcut: A Semi-Automated Video Object Segmentation Framework Using Cellular Automata", IEEE CCECE 2011, pp. 81-84.*

(Continued)

*Primary Examiner* — Mekonen Bekele
(74) *Attorney, Agent, or Firm* — International IP Law Group, PLLC

(57) ABSTRACT

A method and an apparatus for multi-label segmentation of an image are described. In a first step user defined labels are determined for one or more pixels of the image. Then a fraction of the pixels of the image for which no user defined label is determined is pre-initialized. Finally, a cellular automaton-based segmentation of the image is performed using the user defined labels and the pre-initialized pixels.

12 Claims, 3 Drawing Sheets

(56) References Cited

U.S. PATENT DOCUMENTS

2013/0022251 A1* 1/2013 Chen et al. .................. 382/131
2013/0169639 A1* 7/2013 Shi et al. ...................... 345/424

OTHER PUBLICATIONS

Vezhnevets V, Konushin V, "GrowCut"—Interactive Multi-Label N-D Image Segmentation by Cellular Automata, Year of Publication 2005, pp. 7.*
Keyu Lu et al., "A Hierarchical Approach for Road Detection", 2014 IEEE International Conference on Robotics & Automation, May 31-Jun. 7, 2014, pp. 517-522.*
Oliver Jakob Arndt et al., ""RegionCut"—Interactive Multi-Label Segmentation Utilizing Cellular Automaton", data of conference Jan. 15-17, 2013, pp. 8.*
"Image Segmentation Using Cellular Automata: A Technical Survey", Priyanka Shotrya et al., vol. 2 Issue 4 Apr. 2013 p. 1268-1272.*
Blake et al., "Interactive image segmentation using an adaptive GMMRF model", 8th European Conference on Computer Vision (ECCV), Prague, Czech Republic, May 11, 2004, pp. 428-441.
Boykov et al., "An Experimental Comparison of Min-Cut/Max-Flow Algorithms for Energy Minimization in Vision", IEEE Transactions on PAMI, vol. 26, No. 9, Sep. 2004, pp. 1124-1137.
Boykov et al., "Fast approximate energy minimization via graph cuts", IEEE Transactions on Pattern Analysis and Machine Intelligence, vol. 23, No. 11, Nov. 2001, pp. 1222-1239.
Boykov et al., "Interactive Graph Cuts for Optimal Boundary and Region Segmentation of Objects in N-D Images", Proceedings of Information Conference on Computer Vision, Vancouver Canada, Jul. 2001, pp. 105-112.
Chan et al., "Active contours without edges", IEEE Transactions on Image Processing, vol. 10, No. 2, Feb. 2001, pp. 266-277.
Cremers et al., "A probabilistic level set formulation for interactive organ segmentation", Proceedings SPIE 6512, Medical Imaging 2007, Mar. 3, 2001, pp. 1-9.
Felzenszwalb et al., "Efficient belief propagation for early vision", Computer Vision and Pattern Recognition 2004 (CVPR 2004), Jun. 27, 2004, pp. 261-268.
Hernandez et al., "Cellular automata for elementary image enhancement", Graphical Models and Image Processing, vol. 58, No. 1, Jan. 1996, pp. 82-89.
Anonymous, "GPU4Vision", www.GPU4Vision.org, http://web.archive.org/web/20120307020134/http://gpu4vision.icg.tugraz.at/, Mar. 7, 2012, pp. 1-2.
Rother et al., "Grabcut", Image and Video Editing, http://web.archive.org/web/20120210195153/http://research.microsoft.com/en-us/um/cambridge/p . . . , Feb. 10, 2012, pp. 1-2.
Anonymous, "The Berkeley Segmentation Dataset and Benchmark", http://www.eecs.berkeley.edu, http://web.archive.org/web/20120105021544/http://www.eecs.berkeley.edu/Research/Projects/CS/ . . . , Jan. 5, 2012, pp. 1-4.
Kass et al., "Snakes—Active contour models", International Journal of Computer Vision, 1988, pp. 321-331.
Mortensen et al., "Interactive segmentation with intelligent scissors", Graphical Models and Image Processing, vol. 60, No. 5, Sep. 1998, pp. 349-384.
Popovici et al., "Cellular automata in image processing", American Mathematical Society, Los Angeles, California, USA, Aug. 7, 2000, pp. 1-6.
Rother et al., "Grabcut-Interactive foreground extraction using iterated graph cuts", ACM Transactions on Graphics, vol. 23, No. 3, Aug. 2004, pp. 309-314.
Santner et al., "Interactive multi-label segmentation", Asian Conference on Computer Vision 2010, Queenstown, New Zealand, Nov. 8, 2010, pp. 397-410.
Santner et al., "Interactive texture segmentation using random forests and total variation", British Machine Vision Conference 2009, London, United Kindom, Sep. 7, 2009, pp. 1-12.
Unger et al., "TVSeg-interactive total variation based image segmentation", British Machine Vision Conference 2008, Leeds, United Kingdom, Sep. 1, 2008, pp. 1-10.
Von Neumann, J., "Theory of self-reproducing automata", Editor Arthur W. Burks, University of Illinois Press, Urbana, 1966, pp. 64-87.
Wang et al., "Efficient label propagation for interactive image segmentation", 6th International Conference on Machine Learning and Applications, Cincinnati, Ohio, USA, Dec. 13, 2007, pp. 136-141.
Scheuermann et al., "Interactive Image Segmentation Using Level Sets and Dempster-Shafer Theory of Evidence", Scandinavian Conference on Image Analysis 2011, Ystad Saltsjobad, Swedon, May 23, 2011, pp. 1-10.

* cited by examiner

METHOD AND APPARATUS FOR IMAGE SEGMENTATION

This application claims the benefit, under 35 U.S.C. §119 of European Patent Application 12290140.8, filed Apr. 20, 2012 and European Patent Application 12306092.3, filed Sep. 11, 2012.

FIELD OF THE INVENTION

The invention relates to a method and an apparatus for segmentation of an image. More specifically, the invention refers to a method and an apparatus for segmentation of an image using a cellular automata-based algorithm, which is suitable for high resolution images or image sequences.

BACKGROUND OF THE INVENTION

Interactive image segmentation is a popular field of research in computer vision. The aim of an interactive segmentation framework is to extract one or more foreground objects from the background. Applications for interactive image segmentation include photo editing and medical image analysis. Examples for popular interactive frameworks are Graph Cuts, GrabCut, active contours and interactive level-sets, TV-Seg, efficient belief propagation or Intelligent Scissors.

GrabCut is based on the works of Y. Boykov et al: "*Interactive graph cuts for optimal boundary & region segmentation of objects in nd images*" Proceedings of the Eighth International Conference On Computer Vision (ICCV-01) (2001), Vol. 1, pp. 105-112 by iteratively performing Graph Cuts. The user provides a rectangle around the desired object as an initial segmentation. This segmentation is used to approximate the appearance of the foreground and background respectively by Gaussian Mixture Models (GMMs). The negative log-likelihoods of the GMMs are assigned to each pixel and Graph Cut is used to update the segmentation. These steps are repeated iteratively. Similarly B. Scheuermann et al: "Interactive image segmentation using level sets and Dempster-Shafer theory of evidence", Scandinavian Conference on Image Analysis (SCIA) (2011), pp. 656-665 proposed an interactive segmentation scheme based on level-sets and Dempster's theory of evidence. Here the user provides several strokes marking object and background regions. The histograms of these regions are included in a continuous energy function using Dempster's rule of combination. The defined energy function is minimized iteratively by solving the corresponding Euler-Lagrange equation.

In F. Wang et al.: "*Efficient label propagation for interactive image segmentation*", International Conference on Machine Learning and Applications (ICMLA) (2007), pp. 136-141 the efficient label propagation (ELP) has been proposed for interactive image segmentation. In an interactive manner, user defined labels are automatically propagated over the remaining unlabeled pixels. ELP is related to the efficient belief propagation proposed by P. F. Felzenszwalb et al.: "*Efficient belief propagation for early vision*", Int. J. Comput. Vis. Vol. 70 (2006), pp. 41-54.

In general energy minimization methods based on Graph Cuts or level-sets outperform other methods in terms of segmentation quality and required user effort. However, these energy minimizing methods are hard to implement and hard to control. As an alternative an interactive segmentation scheme based on cellular automata (CA) has been suggested, the so called "GrowCut" algorithm. It is an intuitive method to segment an image and can be implemented very easily. The algorithm has been used in the computer vision community for image denoising and edge detection. Important properties of this approach are the possibility to perform multi-label segmentation tasks and the ability that the algorithm can be extended to higher dimensions.

However, experiments have shown that the algorithm is very sensitive to small changes in the user given seeds. Thus, the algorithm can be caught in local minima, which are not ideal segmentations. That means the user has to invest much time for correcting the seeds to obtain an adequate segmentation. For an interactive segmentation scheme it is not acceptable to pursue a trial-and-error-procedure for the initialization. In addition, compared to other methods, the results of GrowCut are not competitive. One point is that typically given user initializations are strokes, but never hundreds of pixel-like seeds. In experiments the segmentations using GrowCut rarely achieve the quality of energy minimizing segmentation algorithms.

SUMMARY OF THE INVENTION

It is an object of the invention to propose a solution for multi-label segmentation of an image using a cellular-automata-based algorithm, which has an improved performance.

According to the invention, a method for segmentation of an image comprises the steps of:
  determining user defined labels for one or more pixels of the image;
  pre-initializing a fraction of the pixels of the image for which no user defined label is determined; and
  performing a cellular automaton-based segmentation of the image using the user defined labels and the pre-initialized pixels.

Accordingly, an apparatus for segmentation of an image is adapted to perform the steps of:
  determining user defined labels for one or more pixels of the image;
  pre-initializing a fraction of the pixels of the image for which no user defined label is determined; and
  performing a cellular automaton-based segmentation of the image using the user defined labels and the pre-initialized pixels.

According to the present inventions improvements to existing binary or multi-layer segmentation algorithms are proposed, especially to the GrowCut algorithm. These extensions make the GrowCut algorithm competitive to state-of-the-art segmentation schemes. A first improvement is a pre-initialization step based on user labeling. This brings regional properties into the edge based GrowCut algorithm. Therefore, region statistics are modeled based on the user input and similar pixels are assigned with high probability to the same region.

Advantageously, the fraction of pixels which are pre-initialized is user-settable. This provides the possibility of controlling the level of automatically pre-initializing spread seeds and expands the user convenience.

Preferably, a strength assigned to the pixels for which a user defined label is determined is larger than a strength assigned to the pre-initialized pixels. Since there is no guarantee for a correct decision during pre-initialization, this ensures that the pre-initialized pixels can be occupied by regions coming from user seeds.

Favorably, Gaussian mixture models are used to determine labels for the pre-initialized pixels. Gaussian mixture models have the advantage that they are robust, computationally efficient and relatively easy to implement.

Advantageously, the step of pre-initializing a fraction of the pixels of the image for which no user defined label is determined comprises:

- assigning label probabilities of the pixels to n dimensional vectors, where n is the number of labels;
- performing an n-sphere transformation of the n dimensional vectors;
- smoothing each dimension of the n-sphere coordinates to obtain a smoothed vector field; and
- retransforming the smoothed vector field.

This approach utilizes dependencies between the probabilities of the labels for achieving smoothed results of the pre-initialization.

A further improvement is to apply a weighting function to a strength of a pixel, which maintains the strength for small color differences between neighboring pixels and decreases the strength for larger color differences. This improvement makes use of the median color noise to refine the costs for neighboring pixels, taking into account the overall pixel gradients. In this way weakening the strength of the pixels at outer boundaries of regions is avoided, while still ensuring that the region growing stops at a high gradient.

BRIEF DESCRIPTION OF THE DRAWINGS

For a better understanding the invention shall now be explained in more detail in the following description with reference to the figures. It is understood that the invention is not limited to this exemplary embodiment and that specified features can also expediently be combined and/or modified without departing from the scope of the present invention as defined in the appended claims. In the figures:

DETAILED DESCRIPTION OF PREFERRED EMBODIMENTS

Figure 1:
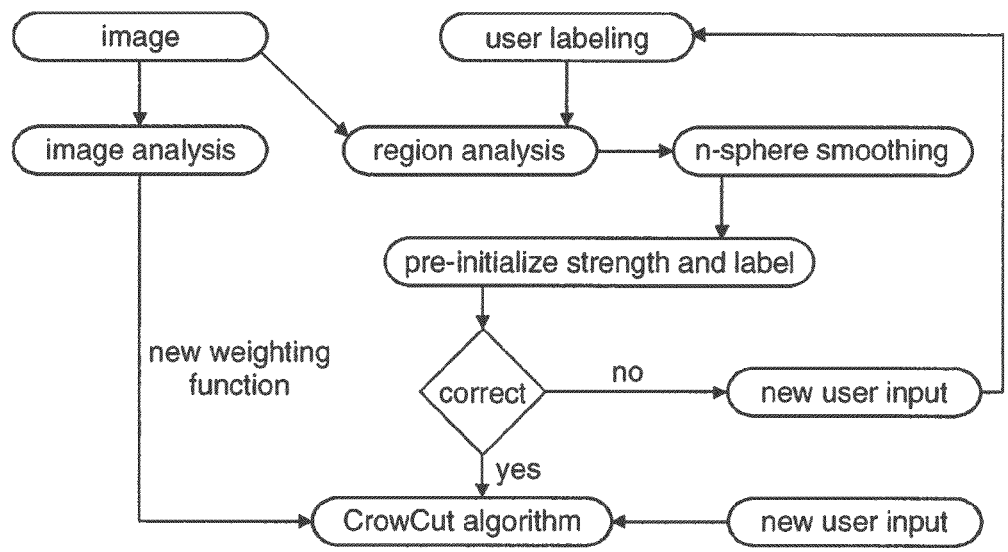
FIG. 1 illustrates an improved segmentation work-flow.

The main idea of GrowCut is that user defined seed pixels iteratively try to occupy their neighbors. Therefore each pixel has a defined strength. Initially the strength is set to one for each seed pixel and zero for all other, so that the seed pixels expand over the image until the edges of two different labels contact each other.

At each iteration the strength of an attacking pixel is multiplied with a linear function $g_{lin} \to [0.1]$ to reduce the attacking pixels strength. The color difference of attacking pixel p and attacked pixel q is used to define $g_{lin}$. The idea is to highly reduce the strength of an attacking pixel if the color difference is high, it is defined by $$g_{lin}(I_p, I_q) = 1 - \frac{\|I_p - I_q\|}{c_{max}} \geq 0, \quad (1)$$

where $I_{(p,q)}$ is the color vector of pixels p and q, and $c_{max}$ is the maximum color difference.

Let p be the attacking and q the attacked pixel, $\theta_p$ the strength and x the color gradient between p and q, then p occupies q if the decreased strength $\theta_p \cdot g_{lin}(x)$ is higher than $\theta_q$. In this case the label $l_q$ will be set to $l_p$ and the strength $\theta_q$ will be set to $\theta_p \cdot g_{lin}(x)$. Iteratively each pixel in l tries to occupy its neighbors until convergence.

Since the given competition rule is multi-label capable, GrowCut naturally supports multi-label segmentations. GrowCut is also attractive as a user interactive segmentation method because of the possibility to directly influence the algorithm while iterating. A mindful user who notices a label area flooding across an edge is able to decrease the flooding pixel's strength to allow the surrounding pixels to recapture this area.

In the following a first improvement shall be discussed, which focuses on the problem of determining an adequate initialization with spread seeds. Those seeds can be stated as the expected initialization of GrowCut. Based on the given user seeds GMMs are taught to approximate the appearance of each region and compute the probability for each pixel belonging to so a particular region. The probability differences are used to decide which label is likely for a given pixel.

According to the invention, for a given threshold θ the non-labeled pixels are automatically pre-initialized. If the probability difference $P_i - P_j$ for a label i is greater than the threshold θ for all other labels j, the pixel's initial label $l_p$ is i.

Since there is no guarantee for a correct decision, it is necessary to ensure that the pre-initialized pixels can be occupied by regions coming from user seeds. That means that the strength $\theta_i$ for a pre-initialized pixel has to be lower than the strength of the user-initialized pixels. Since the strength of the user-initialized pixels is set to 1, the strength of the pre-initialized pixels is preferably set to 0.9.

Due to the differences of color distribution from image to image, the probabilities can fluctuate. Additionally, the fluctuation can be influenced by the validity of the initial strokes set by the user, which are used as training data for region models. To prevent the pre-initialized area to be influenced by the validity of user strokes the following method is implemented.

The pre-initialization starts by setting the threshold θ to an initial value $\theta_0$ in the interval [0; 1]. In images with clearly color divided regions the probabilities might be split into values around 0 and values around 1. This large gap between the probabilities causes the pre-initialization to fill nearly the whole image when the initial value $\theta_0$ is chosen too low. The value $\theta_0$ is, therefore, preferably set to 0.95. Now the threshold θ is decreased by ϵ for every iteration. A new iteration with a decreased threshold will be carried out while the initialized area A (in percent), of the area which was not user-initialized, is lower than a given value $A_{max}$. Experiments have shown that a good choice is $A_{max}=70\%$, meaning that 70% of the non-seed pixels are pre-initialized.

Compared with the iterations much less time is needed to calculate the pre-initialization. Consequently, the work-flow advantageously stops after pre-initialization to let the user correct the strokes or the initialization area $A_{max}$. This approach provides the possibility of controlling the level of automatically pre-initializing spread seeds and expands the user convenience.

On the one hand the idea is to pre-initialize the area by region measures as much as possible. Thus, no iterating is needed for these pixels. On the other hand, when the image is as pre-segmented, there has to be space between the regions for the GrowCut algorithm in order to find edges which cannot easily be found with color distribution analysis. Adding the proposed approach combines the advantages of region- and pixel-based segmentation algorithms.

Due to automatically seeding the image, single seeds may occur in wrong regions. To avoid this effect an erosion could be processed on the labeling image, but this solution also reduces the pre-initialized area. In the following an alternative solution to improve the probability data to achieve the best pre-initialization is described, which does not require to manipulate the seeds calculated before.

According to the invention, dependencies between the probabilities of the labels are utilized for achieving smoothed results of the pre-initialization. To this end, a single pixel is selected and the collectivity of probabilities for each region is interpreted as spanning an n-dimensional space. Now the probabilities of each pixel are represented as an n-dimensional vector in Cartesian coordinates, in which n is the number of used labels. Via this association a transformation to n-sphere coordinates can be performed, where the probability dependencies are directly mapped to the angles. The transformation is given by:

$$\vartheta_k = \arctan\frac{\sqrt{\sum_{i=k+1}^{n} P_i^2}}{P_k}, r = \sqrt{\sum_{i=1}^{n} P_i^2} \quad (2)$$

Processing a smoothing on each dimension of the n-sphere coordinates respects all dependencies and the intensity separately.

The smoothed vector field has to be retransformed, as shown in equation 3, to recover the probabilities of each pixel. Afterwards, the enhanced probabilities can be passed to the is pre-initialization method, which initializes exactly a percentage of $A_{max}$ of the image.

$$P_k = r \cdot v(k) \cdot \prod_{i=1}^{k-1} \sin(\vartheta_i), v(k) = \begin{cases} \cos(\vartheta_k), & k < n \\ 1, & k = n \end{cases} \quad (3)$$

In the following a further improvement shall be discussed, namely the inclusion of a new weighting function that degrades the strength of an attacking pixel. If there is a high gradient, the probability for this position of being an edge is high. Consequently, the attacking pixel should be weak in order not to break through the edge. The GrowCut algorithm uses a simple linear function for this (see equation 1). In contrast the new weighting function descried below adapts to probability distributions in the image.

Objects in an image rarely are homogeneous. According to the rising distance to an initial seed, the strength of the pixels decreases because color variations are summed up. This problem can be partly improved by using the pre-initialization discussed above, because this method spreads seeds all over the image, which prevents long distances. Nevertheless, some problems are still encountered, which are tackled by the new weighting function.

In order to avoid weakening the strength of the pixels at outer boundaries of regions, but still let the region growing stop at a high gradient, the median noise is used to influence the weighting function. Therefore, the following function is defined:

$$g_{cos}(x,k) = \tfrac{1}{2} \cdot (1+\cos(\pi \cdot x^k)). \quad (4)$$

This function maintains the weight of the pixels for small color differences and decreases it for greater color differences using an adjusted cosine. The parameter k is used to slide the falling edge towards or away from the y-axis. Analyzing the image data and extracting the median gradient allows to calculate k automatically by setting a desired tolerance. The tolerance in this case denotes the weakening of the strength of the pixels while the regions and the distances to the seeds are growing. Setting a low tolerance at the median gradient of the image will cause moving the g-functions' falling edge away from the y-axis. Thus, the strength will decrease minimally by lower color differences. However, setting the tolerance too high will cause the regions breaking through high gradients. In this case the algorithm would not detect edges.

Let t be the tolerance. Based on the condition $g_{cos}(x_{median}, k) \overset{!}{=} 1-t$ an equation for k can be derived. Thus, the weakening will be constant for every median image gradient in contrast to the linear g-function, whose weakening is not predictable. Experiments have shown that a good tolerance is 0.005.

To stretch the falling edge a linear combination of $g_{lin}(x)$ and $g_{cos}(x,k)$ weighted with the parameter l is used, as shown in equation 5. The experiments have shown that l does not depend on region measures. In all experiments the value l has been fixed to 0.8.

$$g(x,l,k) = l \cdot g_{cos}(x,k) + (1-l) \cdot g_{lin}(x) \quad (5)$$

Due to the proposed extensions some additional parameters are included in the segmentation work-flow, which is shown in FIG. 1. After initializing the algorithm with a user labeling, the regions are analyzed to compute the pre-initialization. The user can control the pre-initialization by adding new strokes or varying the parameter θ. If the pre-initialization is correct, the weighting function is calculated and the iterative GrowCut algorithm starts. To stay focused on user convenience it is necessary to find a balance between user interactivity and automatic parameter calculation. In this case it is possible for the user to manipulate and correct the automatic calculated initialization.

The first possibility for the user to control the algorithm is when painting the user strokes. The second possibility to influence the work-flow can be integrated after the first try to pre-initialize as much area as possible.

To extend the GrowCut algorithm three different kinds of region analysis are used to pass an optimized initialization and information about the noise level within the image. From the user strokes GMMs are learned to approximate the appearance of each region. Based on these region models are the probabilities $P_{i,k}$ for each pixel p belonging to region i are assigned. The n-sphere smoothing is used to improve the pixel based probability data. The enhanced probabilities are used for pre-initialization. The mean gradient of the image is used to define the proposed cosine weighting function.

All operations used for pre-initialization and used in GrowCut iterations are highly parallelizable. The evolution rule can be implemented as a two-dimensional convolution so that the is algorithm could assert itself in real-time-applications.

The pre-initialization is also compatible with other segmentation methods using initial seeds.

In the following results of the proposed improvements and the interaction in the work-flow shall be presented. For evaluating the proposed method and to compare it with other segmentation algorithms, the Microsoft segmentation benchmark was used, which is available at http://research.microsoft.com/en-us/um/cambridge/projects/visionimagevideoediting/segmentation/grabcut.htm and http://www.eecs.berkeley.edu/Research/Projects/CS/vision/ grouping/segbench/. Since the algorithm uses user strokes, stroke tri-maps have been created for initialization. The error measurement used for binary segmentation is defined by $$\varepsilon = \frac{\text{no. misclassified pixels}}{\text{no. pixels in unclassified region}}. \quad (6)$$

For the problem of multi-label segmentation the IcgBench dataset, available at http://gpu4vision.icg.tugraz.at/, and the mean Dice evaluation score given by $$\text{score} = \frac{1}{N}\sum_{i=1}^{N}\text{dice}(E_i, GT_i) = \frac{1}{N}\sum_{i=1}^{N}\frac{2|E_i \cap GT_i|}{|E_i| + |GT_i|}, \quad (7)$$

are employed, where $|\cdot|$ denotes the area of a segment $E_i$, $GT_i$ the ground-truth labeling and N the number of segments.

Table 1 shows the evaluation (error rates on 50 images) of the proposed RegionCut algorithm for binary segmentation on the Microsoft segmentation benchmark in comparison with the original GrowCut algorithm and Graph Cut using a rough stroke initialization. It can be seen that both improvements, the proposed pre-initialization and the new weighting function, enhance the GrowCut segmentation scheme. In combination the proposed RegionCut clearly outperforms the original GrowCut algorithm as well as the Graph Cut framework in terms of the mean error rate.

TABLE 1

| Segmentation method | Error rate |
| --- | --- |
| Original GrowCut | 11.59% |
| GrowCut with new g | 10.96% |
| GrowCut with init (5 Gaussian) | 7.19% |
| RegionCut | 6.46% |
| Graph Cut ($\gamma$ = 50, 5 Gaussian) | 7.22% |
| Graph Cut ($\gamma$ = 20, 5 Gaussian) | 7.72% |

Figure 2:
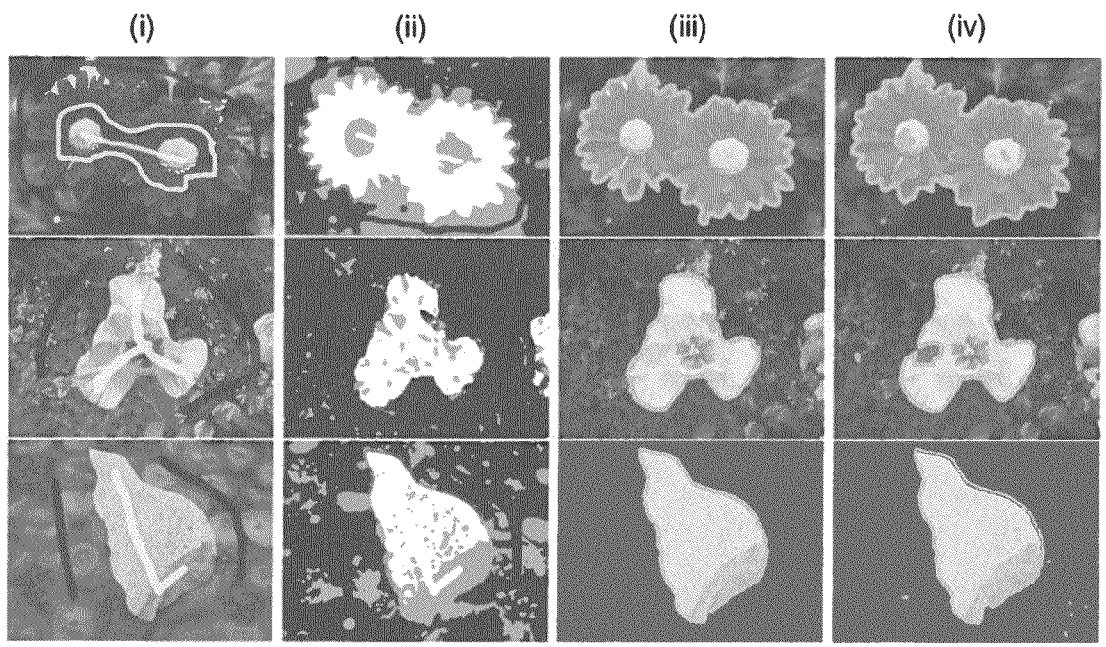
FIG. 2 visualizes a pre-initialization according to the invention and segmentation results using RegionCut and Graph Cut.

FIG. 2 visualizes the proposed pre-initialization and the segmentation results using RegionCut and Graph Cut based on a sparse initialization. Column (i) shows the original images of the Microsoft dataset and the seeds. Column (ii) depicts the proposed pre-initialization, white pixels are pre-initialized as foreground and black pixels are background. Columns (iii) and (iv) show the segmentation result using RegionCut and Graph Cut, respectively. Comparing the segmentation results there are only minor differences.

Figure 3:
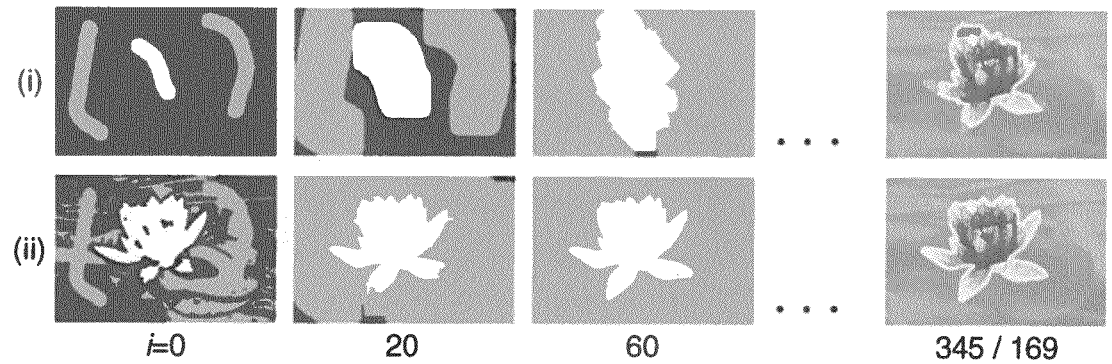
FIG. 3 shows a comparison of seed propagation between GrowCut and RegionCut.

A comparison of the seed propagation between GrowCut and RegionCut is given in FIG. 3. Row (i) shows the case of the original GrowCut algorithm. Row (ii) shows the case of the RegionCut algorithm using the proposed pre-initialization and the new weighting function. The value i states the number of iterations. Compared to GrowCut, RegionCut performs better and converges significantly faster.

Figure 4:
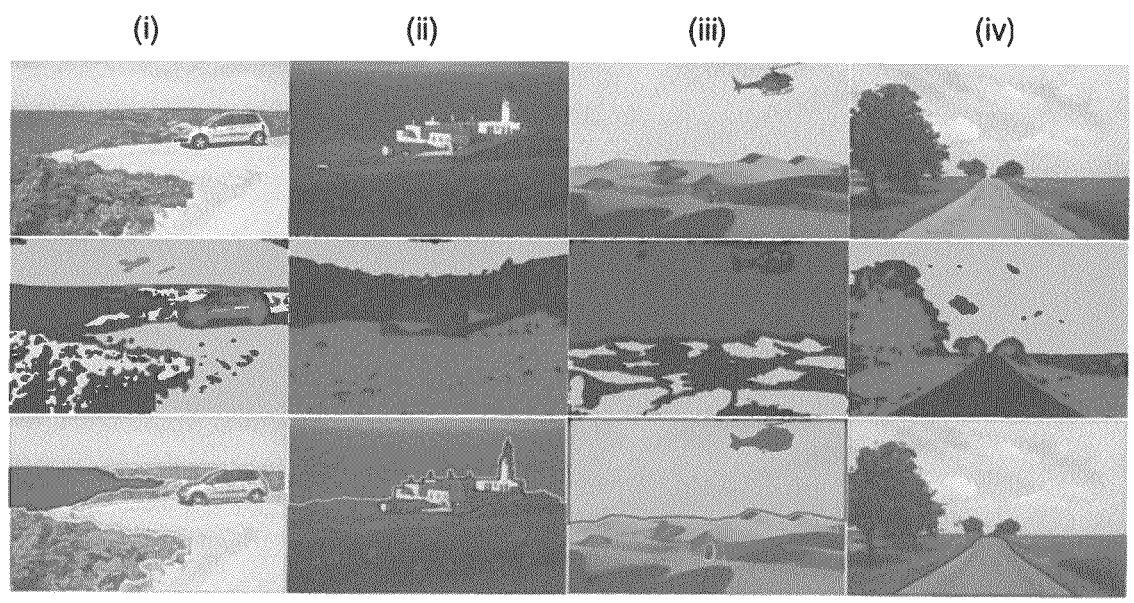
FIG. 4 depicts exemplary multi-label segmentations and pre-initializations, FIG. 5 schematically illustrates a method according to the invention for image segmentation.

The proposed RegionCut can also be applied to the problem of multi-label segmentation. To evaluate the segmentation quality the IcgBench dataset was used, which contains 262 stroke initializations and corresponding ground-truth labels on 158 natural images. For evaluation RegionCut was compared to the original GrowCut and an interactive segmentation scheme based on random forests proposed by J. Santner et al.: "Interactive multi-label segmentation", 10th Asian Conference on Computer Vision (ACCV) (2010), pp. 397-410. The mean dice score for the 262 stroke-ground-truth pairs of the IcgBench dataset using RegionCut was 0.886. Compared to GrowCut (score=0:820) the score increased significantly. Furthermore, using only RGB color features RegionCut is competitive to the interactive energy minimization scheme proposed by Santner et al. (score=0:887). Exemplary segmentations and pre-initializations are shown in FIG. 4. Row (i) shows the original images and seeds. Row (ii) depicts the proposed pre-initialization. Row (iii) shows the segmentation results.

Figure 5:
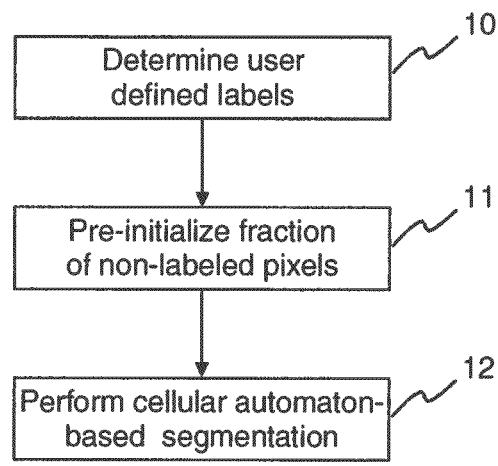

FIG. 5 schematically illustrates a method according to the invention for image segmentation. In a first step user defined labels are determined 10 for one or more pixels of the image. A fraction of the pixels of the image for which no user defined label is determined is then pre-initialized 11. Subsequently a cellular automaton-based segmentation of the image is performed 12 using the user defined labels and the pre-initialized pixels.

Figure 6:
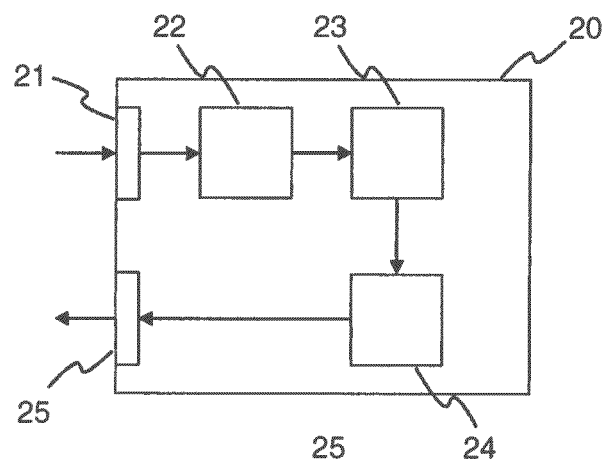
FIG. 6 depicts an apparatus adapted to perform a method according to the invention for image segmentation.

An apparatus 20 adapted to perform a method according to the invention for image segmentation is schematically depicted in FIG. 6. The apparatus 20 comprises a user interface 22 for determining 10 user defined labels for one or more pixels of an image that is received via an input 21. A pre-initializer 23 pre-initializes 11 a fraction of the pixels of the image for which no user defined label is determined. A segmenter 24 performs 12 a cellular automaton-based segmentation of the image using the user defined labels and the pre-initialized pixels. Preferably the pre-initializer 23 and the segmenter 24 are implemented as microprocessors. Of course, they may likewise be combined into a single processing block. The assigned labels or the image with its assigned labels are made available for further processing via an output 25.

What is claimed is:

1. A method for multi-label segmentation of an image, the method comprising:
    determining user defined labels for one or more pixels of the image and assigning a first strength to the pixels of the image;
    pre-initializing a fraction of the pixels of the image for which no user defined label is determined and assigning a second strength to the fraction of the pixels, the second strength being smaller than the first strength and larger than a third strength;
    assigning the third strength to remaining pixels of the image; and
    performing a cellular automaton-based segmentation of the image using the user defined labels, the pre-initialized fraction of the pixels, the first strength, the second strength, and the third strength.

2. The method according to claim 1, wherein the pre-initialized fraction of the pixels is user settable.

3. The method according to claim 1, wherein Gaussian mixture models are used to determine labels for the pre-initialized pixels.

4. The method according to claim 1, wherein the step of pre-initializing the fraction of the pixels of the image for which no user defined label is determined comprises:
    assigning label probabilities of the fraction of the pixels to n-dimensional vectors, where n is a number of labels;
    performing an n-sphere transformation of the n-dimensional vectors;
    smoothing each dimension of coordinates of the n-sphere to obtain a smoothed vector field; and
    retransforming the smoothed vector field.

5. The method according to claim 1, wherein a weighting function is applied to a strength of a pixel, which maintains the strength for small color differences between neighboring pixels and decreases the strength for larger color differences.

6. The method according to claim 1, wherein the cellular automaton-based segmentation uses a GrowCut algorithm.

7. An apparatus for multi-label segmentation of an image, wherein the apparatus comprises:
a user interface that determines user defined labels for one or more pixels of the image;
a pre-initializer that pre-initializes a fraction of the pixels of the image for which no user defined label is determined; and
a segmenter that performs a cellular automaton-based segmentation of the image using the user defined labels the pre-initialized fraction of the pixels, and strengths assigned to the pixels;
wherein the apparatus assigns a first strength to the one or more pixels for which the user defined labels are determined, assigns a second strength to the pre-initialized fraction of the pixels, and assigns a third strength to remaining pixels of the image, the second strength being smaller than the first strength and larger than the third strength.

8. The apparatus according to claim 7, wherein the pre-initialized fraction of the pixels is user-settable.

9. The apparatus according to claim 7, wherein the apparatus uses Gaussian mixture models to determine labels for the pre-initialized fraction of the pixels.

10. The apparatus according to claim 7, wherein the apparatus pre-initializes the fraction of the pixels of the image for which no user defined label is determined by:
assigning label probabilities of the fraction of the pixels to n-dimensional vectors, where n is a number of labels;
performing an n-sphere transformation of the n-dimensional vectors to n-sphere coordinates;
smoothing each dimension of the n-sphere coordinates to obtain a smoothed vector field; and
retransforming the smoothed vector field.

11. The apparatus according to claim 7, wherein the apparatus applies a weighting function to a strength of a pixel, which maintains the strength for small color differences between neighboring pixels and decreases the strength for larger color differences between neighboring pixels.

12. The apparatus according to claim 7, wherein the cellular automaton-based segmentation uses a GrowCut algorithm.

* * * * *